United States Patent [19]

Bozzato et al.

[11] 3,880,931

[45] Apr. 29, 1975

[54] NOVEL NOREREMOPHILANE DERIVATIVES

[75] Inventors: Giuliano Bozzato, Kusnacht; Mario Pesaro, Zurich; Peter Schudel, Grut near Wetzikon; Marianne Hug-Inderbitzin, Schwerzenbach, all of Switzerland; Robert Edward Erickson, Westfield, N.J.

[73] Assignee: Givaudan Corporation, Clifton, N.J.

[22] Filed: Sept. 21, 1973

[21] Appl. No.: 399,595

Related U.S. Application Data

[62] Division of Ser. No. 111,736, Feb. 1, 1971, Pat. No. 3,819,711.

[30] Foreign Application Priority Data

Feb. 19, 1970 Switzerland.......................... 2394/70

[52] U.S. Cl........... 260/586 F; 252/522; 260/617 F; 260/586 C
[51] Int. Cl............................................ C07c 49/54
[58] Field of Search.......... 260/586 R, 587, 586 F

[56] References Cited
UNITED STATES PATENTS
2,671,808   3/1954   Johnston et al................ 260/586 R OTHER PUBLICATIONS
Berlstein; "Org. Chem.," Vol. VII, III supplement, pp. 1259–1267, (1944).
Berlstein; "Org. Chem." Vol. VII, III supplement, pp. 692–693. (1949).
"Chem. Abstracts," Vol. 64, p. 14225a (1966).

*Primary Examiner*—Bernard Helfin
*Assistant Examiner*—Norman Morgenstern
*Attorney, Agent, or Firm*—Thomas Cifelli, Jr.

[57]   ABSTRACT

There are provided certain 2-oxygenated-6-isopropyldecalins, methyl substituted and unsaturated derivatives thereof which possess interesting and useful properties as odorants and flavorants.

4 Claims, No Drawings

3,880,931

NOVEL NOREREMOPHILANE DERIVATIVES

This is a division of application Ser. No. 111,736 filed Feb. 1, 1971, now U.S. Pat. No. 3,819,711.

FIELD OF THE INVENTION

Novel oxygenated bicyclic odorants.

RELATED APPLICATIONS

This application claims priority from applicant's Swiss Application 2394/70, filed Feb. 19, 1970.

DESCRIPTION OF THE PRIOR ART

The synthesis of nootkatone, a structurally related natural product has been reported by Pesaro et al. (Chem. Comm. 1152-54 (1968)). This synthesis involves a number of stereochemical problems and while it provides a source of nootkatone which is an alternative to the natural material it was desirable to seek substitutes for nootkatone, having comparable properties which did not present the difficulties of the nootkatone synthesis.

SUMMARY OF THE INVENTION

The present invention is concerned with new compounds of the general formula

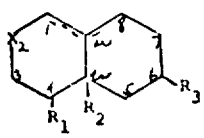

wherein $R_1$ and $R_2$ signifies hydrogen or methyl, but at least one of the symbols $R_1$ or $R_2$ signifies hydrogen, X represents one of the residues

$R_3$ is isopropyl, isopropenyl or isopropylidene and the symbol ==== represents a C—C single bond or C=C double bond, their use as odorants and/or flavorings as well as a process for their manufacture.

Formula I, as also all other formulae occurring in the description and in the claims, is menat to include all stereoisomers.

The above formula I includes as sub-groups the compounds of the following formulae

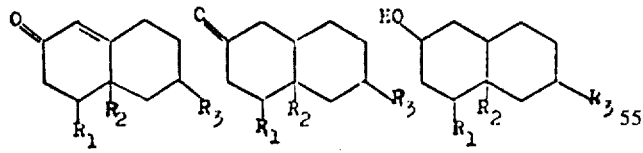

Ia     Ib     Ic

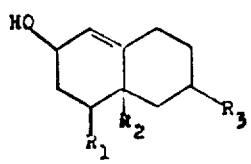

Id where $R_1$, $R_2$ and $R_3$ have the above significance.

The new compounds of formula I are distinguished by interesting odorant and/or aroma properties, especially by fruit, wood, or floral notes.

The new compounds of formula I can be obtained in accordance with the invention by reacting a compound of the formula

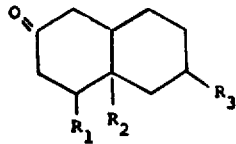
II optionally after prior conversion into an enamine, with a compound of the formula

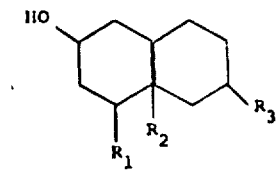
III and optionally hydrogenating the reaction product of the formula

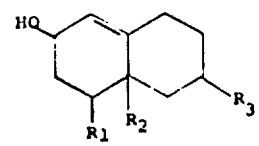
Ia to a compound of the formula

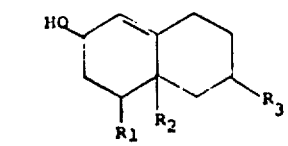
Ib optionally reducing this compound to a compound of the formula

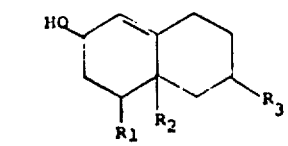
Ic or by optionally reducing the reaction product of formula Ia to a compound of the formula

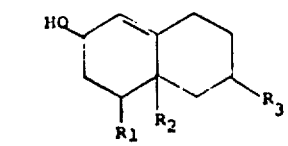
Id $R_1$, and $R_2$ and $R_3$ in formulae $Ia$–$Id$ as well as II and III having the significance stated for formula I.

Compounds of formula II wherein $R_2$ represents the methyl residue can be reacted with a ketone or formula III wherein $R_1 = H$ according to the usual methods of the Robinson annelation. As is known, the latter is a base-induced reaction.

DESCRIPTION OF THE PREFERRED EMBODIMENT

In the preferred embodiment of the reaction of a compound of formula II, wherein $R_2$ is a methyl group, with a compound of formula III, wherein $R_1$ is hydrogen, the reaction is induced by strong base. As bases there come into consideration, for example: sodium methoxide or sodium ethoxide, potassium tert. butoxide, alkali metal hydrides (e.g. sodium hydride), alkali metal amides (e.g. sodium amide). A preferred base is sodium ethoxide.

The reaction is expediently effected in a solvent and with exclusion of air and moisture, thus, for example, in an inert gas (e.g. nitrogen) atmosphere. Suitable solvents are polar anhydrous solvents, for example ethers such as diethyl ether, tetrahydrofuran, etc, or alcohols such as alkanols (e.g. methanol, ethanol); a preferred solvent is ethanol.

The proportion of the compound of formula II to the compound of formula III expediently amounts to approximately 1:1, although an excess of compound III of up to about 10 times the weight of the compound is acceptable.

The reaction temperature expediently lies between about −10°C and the reflux temperature of the solvent. Preferably, the reaction partners are initially left at lower temperature, for example at ca. 5°–10°, and thereupon heated to reflux temperatures for several hours. The mixture is thereupon cooled, expediently to ca room temperature. The reaction mixture is then treated with a strong base, for example the aqueous solution of an alkali metal hydroxide such as NaOH, KOH, etc, suitable 40–50% (by weight) aqueous alkali is used in an amount sufficient to achieve an alkali metal hydroxide concentration of between 1 and 10 %, suitably about 5 %, and thereafter once more heated to reflux temperature, whereby aldolisation and dehydration to a compound of formula $Ia$ occurs.

The isolation of the reaction product can be carried out according to methods which are known per se. For example, the reaction product is taken up in an organic solvent and the organic solution washed firstly with dilute acid such as an $NaH_2PO_4$-solution. After washing neutral and drying, the crude product can be purified by conventional methods such as, for example, adsorption chromatography and/or distillation.

If, on the other hand, one starts from a compound of formula II wherein $R_2 = H$, this compound is expediently first converted into an enamine by means of a secondary amine.

As secondary amines there can, for example, be used:

Aliphatic secondary amines such as dialkylamines (e.g. diethylamine) or cyclic secondary amines such as, for example, morpholine, piperidine, pyrrolidine. Pyrrolidine is preferred. The conversion into the enamine can in other respects be undertaken according to conventional methods, for example by reacting the ketone II with a secondary amine, optionally in the presence of a catalyst such as, for example, p-toluene-sulphonic acid, in a water-withdrawing inert solvent (e.g. methylene chloride, benzene or toluene) at room temperature or, preferably, at elevated temperature (e.g. reflux temperature at the solvent).

The subsequent reaction of the enamine with the ketone of formula III is expediently carried out in a solvent and with exclusion of air and moisture. Suitable solvents are anhydrous solvents such as, for example, ethanol, dioxan, benzene, toluene, dimethylformamimde, etc; toluene and benzene are preferred.

The proportion of enamine to ketone III expediently amounts to approximately 1:1, although the ketone III can also be employed in excess.

The reaction temperature is expediently the reflux temperature of the reaction mixture. The mixture is left, for example, for several hours at this temperature. It is thereupon cooled, expediently to room temperature, and then a weak acid (e.g. an acetate buffer) is added. The amine-cleavage can then be achieved by heating once more (e.g. to reflux temperature).

The reaction product can be finally worked up as already described above.

The ketones of formula $Ib$ saturated in the ring can be obtained in a manner known per se by hydrogenation of the ring double bond of the $\alpha,\beta$-unsaturated ketones of formula $Ia$, expediently by means of an alkali metal (e.g. potassium, sodium, or, preferably, lithium) in liquid ammonia and in the presence of a solvent such as an ether (e.g. diethyl ether, dioxan, dimethoxyethane, or, preferably, tetrahydrofuran. After completed reduction, a proton-donor (e.g. dilute hydrochloric acid, ammonium sulfate, or preferably ammonium chloride) is with advantage added.

The secondary alcohols of formula $Ic$ can be obtained in a manner known per se by reduction of the ketones of formula $Ib$, expediently using reducing agents such as complex borohydrides (e.g. sodium borohydride) or complex aluminum hydrides, such as, for example, the preferred lithium aluminum hydride, and in the presence of a solvent such as an ether (e.g. diethyl ether, dioxan or dimethoxyethane). The reaction temperature expediently lies between about 0°C and room temperature.

The $\alpha,\beta$-unsaturated alcohols of formula $Id$ can be obtained in a manner known per se by reduction of the keto group of a ketone $Ia$ as already described above. When using a complex borohydride, there is expediently used as a solvent an alcohol such as an alkanol (e.g. methanol, ethanol or, preferably, 2-propanol). When using a complex aluminum hydride, on the other hand, there is preferably chosen an ether (e.g. diethyl ether or tetrahydrofuran).

The alcohols of formula $Id$ can finally be converted into the alcohols of formula $Ic$ in a manner known per se by hydrogenation of the ring-double-bond.

The compounds of this invention can be used as odorants for the manufacture of odorant compositions such as perfumess, or for perfuming certain technical products, for example solid and liquid detergents, synthentic washing agents, cleaning agents, aerosols or cosmetic products of all kinds (e.g. soaps, lotions, bath additives, ointments, face milk and make up). These compounds can find use in perfumery on the basis of their wood or floral notes. In odorant compositions the content of compounds of Formula I can, for example, amount to 1 to 15%. A preferred range is constituted by that of 2 to 8%. An addition of 1 to 2% of such an odorant composition usually suffices for perfuming soaps, one of 2 to 4% for lotions (shaving lotion, face lotion, eau de cologne) and one of 0.3 to 5% for bath additives or shampoos.

On the basis of their fruit aroma properties, certain compounds can likewise be used as aromatants for the aromatisation of foods and delicacies as well as of drinks. In the aroma compositions the concentration of the compound is from about 0.01–1% by weight and in the final products containing them between 0.1–100 ppm, preferably from about 1 to about 10 ppm.

Perfumistically particularly interesting compounds are:

6-isopropenyl-2,3,4,4a,5,6,7,8-octahydro-2-naphthalenone (green, woody, persistent note, reminiscent of vetivieryl acetate).

4a-methyl-6-isopropenyl-2,3,4,4a,5,6,7,8-octahydro-2-naphthalenone (green, floral note reminiscent of vetiveryl acetate), 2-hydroxy-6-isopropylidene-2,3,4,4a,5,6,7,8-octahydro-2-naphthalene (flowery, woody, somewhat persistant note), 2-hydroxy-6-isopropyl-1,2,3,4,4a,5,6,7,8,8a-decahydro-naphthalene, (vetiverol-rose note), 6-isopropylidene-1,2,3,4,4a,5,6,7,8,8a-decahydro-2-naphthalenone (intensive, citrus-like, woody note), Of particular interest as an aromatizing agent is 6-isoproyl-1,2,3,4,4a,5,6,7,8,8a-decahydro-2-naphthalenone [citrus aroma (orange, grape-fruit)].

EXAMPLE 1 a. 1.5 g (65.1 m eq.) of sodium are dissolved at 6°–8°C in a nitrogen atmosphere in 156 ml of absolute ethanol. (This nitrogen atmosphere is maintained during the whole of the following reaction duration). A solution of 15 g (99 m mol) of 2-methyl-4-isopropenyl-cyclohexanone in 63 ml of absolute ethanol is then added dropwise with stirring during 20 minutes. The mixture is stirred for 10 minutes and a solution of 10.2 g (145.5 mmol) of vinyl methyl ketone in 69 ml of absolute ethanol is thereupon added dropwise with stirring during 60 minutes. The mixture is allowed to further stir at 6°–8°C for 12 hours. The reaction mixture is thereupon held at reflux for 8 hours. After cooling to room temperature, this mixture is treated with 30 g of 50% aqueous caustic soda. The mixture is thereupon firstly held at room temperature for 30 minutes, then at reflux for 1½ hours. For the working up, the reaction mixture is taken up in ether-ice, washed with a sodium dihydrogen phosphate solution and a sodium chloride solution. It is dried over magnesium sulphate and the solvent is thereupon removed. 25 g of crude mixture being obtained. This is filtered over the 10-fold amount of Silicage in benzene-hexane = 4:1. There are obtained 22.5 g of a product which are subjected to a Vigreux distillation. The fraction with the boiling point 111°–114°C/0.4 Torr (5.5 g) represents 4a-methyl-6-isopropenyl-2,3,4,4a,5,6,7,8-octahydro-2-naphthalenone. $n_D^{20} = 1.5276$; UV spectrum (ethanol) $\lambda_{max} = 238$ nm ($\epsilon = 15,600$); IR spectrum (CCl$_4$): bands at 1,675, 1,650, 1,625, 895 cm$^{-1}$; NMR spectrum (CDCl$_3$): $\delta = 1.26$ ppm (s, 3H); 1.75 ppm (s, 3H); 4.78 ppm (s, 2H); 5.85 ppm (s, 1H). The substance has a green, floral note and is reminiscent of vetiveryl acetate.

b. A solution of 1.049 g (5.13 mmol) of 4a-methyl-6-isopropenyl-2,3,4,4a,5,6,7,8-octahydro-2-naphthalenone in 16 ml of absolute tetrahydrofuran is added to a solution of 330 mg (47 m eq.) of lithium in 150 ml of liquid ammonia (distilled over sodium). The reaction mixture is stirred at −70° for 3 minutes and then treated with 3 g of solid ammonium chloride. After evaporating off the ammonia, the residue is taken up in ether and the organic solution washed neutral with water. After drying the ether phase with magnesium sulphate and sucking off the ether, there remain 1.019 g of an oil which, after distillation in the bulb-tube, yield 933 mg of 4a-methyl-6-isopropenyl-1,2,3,4,4a,5,6,7,8,8a-decahydro-2-naphthalenone with the boiling point 70°C/0.005 Torr. $n_D^{20} = 1.5072$; IR spectrum (CCl$_4$): bands at 1,720, 1,650, 895 cm$^{-1}$; NMR spectrum (CDCl$_3$): $\delta = 1.08$ ppm and 1.27 ppm (s, 3H); 1.70 ppm and 1.85 ppm (s, 3H); 4.70 ppm and 4.85 ppm (s, 2H).

The substance displays a woody, fresh-herby note and is reminiscent of nootkatone.

According to the gas-chromatographic and NMR spectral data obtained, the isolated product exists as a mixture of 2 stereoisomers.

c. 152 mg (4 mmol) of lithium aluminium hydride were suspended in 8 ml of absolute ether and cooled to 0°C. To this solution there is added dropwise, in a nitrogen atmosphere and with stirring, a solution of 442 mg (2 mmol) of 4a-methyl-6-isopropenyl-1,2,3,4,4a,5,6,7,8,8a-decahydro-2-naphthalenone in 16 ml of absolute ether. The mixture is stirred at room temperature for 16 hours. The excess lithium aluminum hydride is decomposed by successive dropwise addition in a nitrogen atmosphere of 0.15 ml of water, 0.15 ml of 15% aqueous caustic soda and 0.45 ml of water. For the working up, the mixture (after stirring at 0°C for 25 minutes) is taken up in ether/ice and the ethereal phase washed neutral with water. It is dried over magnesium sulphate and the solvent removed. There are recovered 405 mg of an oil which, after bulb-tube distillation, give 358 mg of 2-hydroxy-4a-methyl-6-isopropenyl-1,2,3,4,4a,5,6,7,8,8a-decahydro-naphthalene with the boiling point 85°–90°C/0.001 Torr. $n_D^{20} = 1.5121$; IR spectrum (CCl)$_4$ bands at 3,400, 1,650, 895 cm$^{-1}$; NMR spectrum (CDCl$_3$): $\delta = 0.89$ ppm. 0.98 ppm and 1.05 ppm (s, together 3H); 1.72 ppm and 1.81 ppm (s, 3H); 4.69 ppm and 4.84 ppm (s, 2H).

The substance displays a woody note.

According to the NMR spectral data obtained, the isolated product exists as a mixture of stereoisomers.

EXAMPLE 2 a. 138.2 g. (1.0 mol) of 4-isopropenyl-cyclohexanone and 78.1 g (1.10 mol) of pyrrolidine are dissolved in 300 ml of absolute toluene and held at reflux for 3 hours at the water-separator under a nitrogen atmosphere. Thereupon, by distilling off the solvent (250 ml) excess pyrrolidine is also removed. After cooling the residue, a solution of 70.9 g (1.0 mol) of vinyl methyl ketone in 300 ml of absolute toluene is added dropwise with nitrogen flushing and stirring during an hour. The reaction mixture is thereupon held at reflux for 22 hours under a nitrogen atmosphere. It is subsequently allowed to cool to room temperature and the reaction mixture is treated with an acetate buffer solution (37.2 g of anhydrous sodium acetate, 74 ml of water and 74 ml of glacial acetic acid); it is thereupon heated at reflux for a further 4 hours. For the working up, the reaction mixture is cooled to room temperature and diluted with 400 ml of toluene. The aqueous phase is separated off and the organic phase is successively washed with 2-N hydrochloric acid, with saturated aqueous sodium bicarbonate solution and with water and dried over magnesium sulphate. After removal of the solvent, the crude mixture is distilled on a packed column. The fraction (76.3 g) with the boiling point 106°–108°C/0.5 Torr. represents 6-isopropenyl-2,3,4,4a,5,6,7,8-octahydro-2-naphthalenone. $n_D^{20}$ = 1.5291; UV spectrum (ethanol): $\lambda_{max}$ = 238 nm ($\epsilon$ = 13.400); IR spectrum (CCl$_4$): bands at 1,680, 1,650, 1,625, 900 cm$^{-1}$; NMR spectrum (CDCl$_3$): $\delta$ = 1.76 ppm ($s$, 3H); 4.79 ppm ($s$, 2H); 5.88 ppm ($s$, 1H).

The compound has a green, woody, persistent note and its odour is reminiscent of vetiveryl acetate.

b. 1.046 g (5.5 mmol) of 6-isopropenyl-2,3,4,4a,5,6,7,8-octahydro-2-naphthalenone, dissolved in 16 ml of absolute tetrahydrofuran, are added to a solution of 387 mg (55.3 m eq.) of lithium in 150 ml of liquid ammonia (distilled over sodium). The reaction mixture is stirred at −70°C for 4 minutes and then treated with 3.5 g of solid ammonium chloride. After evaporating off the ammonia, the residue is taken up in ether and washed neutral with water. After drying the ether phase with magnesium sulphate and sucking off the ether, there remain 933 mg of an oil which, after distillation in the bulb-tube, yield 831 mg of 6-isopropenyl-1,2,3,4,4a,5,6,7,8,8a-decahydro-2-naphthalenone with the boiling point 70°–80°C/0.001 Torr. $n_D^{20}$ = 1.5013; IR spectrum (CCl$_4$): bands at 1,720, 1,650, 900 cm$^{-1}$; NMR spectrum (CDCl$_3$): $\delta$ = 1.73 ppm ($s$, 3H); 4.72 ppm ($s$, 2H).

The substance displays a fruity, green note which is reminiscent of citrus peel, as well as a woody note in the direction of vetiver and bergamotte.

c. 760 mg (20 mmol) of lithium aluminum hydride are suspended in 42 ml of absolute ether. The mixture is cooled to 0° and, in a nitrogen atmosphere and with stirring, a solution of 950 mg (5 mmol) of 6-isopropenyl- 2, 3, 4, 4a, 5, 6, 7, 8, -octahydro-2-naphthalenone in 42 ml of absolute ether is added dropwise. The mixture is stirred at room temperature for 16 hours. For the working up, the reaction mixture is cooled to 0° C and the excess lithium aluminum hydride destroyed by addition of ethyl acetate; the mixture is thereupon taken up in ether-ice and washed neutral with water. It is dried over magnesium sulphate and the solvent removed. 930 mg of crude product being obtained. After distillation at the bulb-tube, there can be isolated 900 mg of 2-hydroxy-6-isopropenyl-2,3,4,4a,5,6,7,8-octahydro-naphthalene with the boiling point 95°C/0.01 Torr. $n_D^{20}$ = 1.5223; IR spectrum (CCl$_4$): bands at 3,360, 1,650, 900 cm$^{-1}$; NMR spectrum CDCl$_3$): $\delta$ = 1.72 ppm ($s$, 3H); 4.70 ppm ($s$, 2H); 5.43 ppm ($s$, 1H).

The substance displays a marked floral note, reminiscent of roses, with a pleasant woody under-tone.

EXAMPLE 3 a. -isopropylidene-cyclohexanene g (0.01 mol) of 4-isopropylidene-cyclohexane and 1.42 g (0.02 mol) of pyrrolidine are dissolved in 7 ml of absolute benzene and held at reflux for 16 hours under nitrogen at the water-separator. After cooling, the benzene and the excess pyrrolidine are removed by evaporation (water-jet vacuum/60° C) and subsequent drying of the mixture in high vacuum for 1 hour at 25° C. The residue (2.2 g) is dissolved in 4 ml of absolute benzene, treated with 0.7 g (0.01 mol) of vinyl methyl ketone and, under a nitrogen atmosphere and with stirring, held at reflux for 23 hours. After cooling, the mixture is treated with 0.9 ml of an acetate buffer solution (50 g of anhydrous sodium acetate, 100 ml of water and 100 ml of glacial acetic acid) and held at reflux for 4 hours. For the working up, the mixture is taken up in ether-ice, washed twice with 2-N hydrochloric acid, twice with saturated aqueous sodium bicarbonate solution and thereupon again with water. The organic phase is dried over magnesium sulphate and the solvent removed, 2.3 g of a crude mixture being obtained. This is chromatographed on the 50-fold amount of silica gel. With benzene-ether = 19:1, there can be eluted 0.38 g of crude product which, after distillation in the bulb-tube, gives 0.25 g of 6-isopropylidene-2,3,4,4a,5,6,7,8-octahydro-2-naphthalenone with the boiling point 100°–105°C/0.5 Torr. $n_D^{20}$ = 1.5445; UV spectrum (ethanol): $\lambda_{max}$ = 234 nm ($\epsilon$ = 13,500); IR spectrum (CCl$_4$); bands at 1,680, 1,628 cm$^{-1}$; NMR spectrum (CDCl$_3$): $\delta$ = 1.70 ppm ($s$, 6H): 5.86 ppm ($s$, 1H).

The compound has a pleasant α-vetivone-like odor.

b. 1.32 g (40 m mole) of lithium aluminum hydride are suspended in 80 ml of absolute ether in an nitrogen atmosphere and added, with ice cooling and stirring to a solution of 3.80 g (20 m mole) of 6-isopropylidene-2,3,4,4a,5,6,7,8-octahydro-2-naphthalenone in 160 ml of absolute ether in a dropwise manner. The reaction mixture is stirred for 16 hours at room temperature in a nitrogen atmosphere. The excess lithium aluminum hydride is destroyed by adding sequentially at 0°C 1.5 ml of water, 1.5 ml of 15% aqueous sodium hydroxyde and 4.5 ml of water in a dropwise manner, and stirring the resultant mass for a further 20 minutes. The precipitated material is removed by filtration, and the ethereal phase is washed with saturated aqueous sodium chloride solution to neutrality, dried and the ether removed by distillation under reduced pressure. The residue (4.2 g) is distilled by short path distillation (0.04 Torr/130°C), to yield cristalline 2 -hydroxy-6-isopropylidene-2,3,4,4a,5,6,7,8-octahydro-naphthalene (3.7 g) m.p. 62°–63°C, I.R. (CCl$_4$) bands at 3,630, 3,350 and 1,665 cm$^{-1}$, MMR Spectrum (CDCl$_3$) $\delta$= 1.70 ppm ($s$, 6H); 4.22 ppm ($m$, 1H); 5.43 ppm ($m$, 1H).

The compound has a woody flowery odor of highly satisfactory persistance.

c. 9.32 g (49 m mole) of 6-isopropylidene-2,3,4,4a,5,6,7,8-octahydro-2-naphthalenone, dissolved in 60 ml of absolute ether are added slowly to a solution of 3.4 g (490 m seq.) of lithium in 600 ml of liquid ammonia previously distilled over sodium. The temperature of the reaction mixture is held at −80°C for 15 minutes and stirred. The reaction is then quenched by adding thereto 30 q of solid ammonium chloride. The ammonia is allowed to evaporate, the residue taken up in ether and the ether layer washed to neutrality with saturated aqueous sodium chloride solution. The ether layer is then dried over magnesium sulfate, filtered, and the ether evaporated to yield 9.6 g of residue which is then chromatographed on 500 g of silica gel. Elution with benzene/ether (19:1) yields 4.9 g of product which, upon shortpath distillation yields 4.70 g of 6-isopropylidene-1,2,3,4,4a,5,6,7,8,8a-decahydro-2-naphthalenone b.p. 95°–100°C/0.01 Torr. $n_{20}{}^D$ = 1.5102; IR - Spectrum (CCl$_4$) bands at 1,715 cm$^{-1}$; NMR Spectrum (CDCl$_3$); $\delta$ = 1.70 ppm (s, 6H).

The compound has an intensive citrus-like woody odor.

EXAMPLE 4 a. 13.8 g (0.1 mole) of 4-isopropenyl-cyclohexanone and 14.2 g (0.2 mole) of pyrrolidine, dissolved in 70 ml of absolute benzene, are held at reflux for 16 hours under a nitrogen atmosphere at the water-separator. After cooling the mixture, benzene and excess pyrrolidine are removed by evaporation (water-jet vacuum/60°C) and subsequent drying in high vacuum at 25°C for 1 hour. The residue (16 g) is dissolved in 40 ml of absolute toluene, treated with 9.2 g (0.1 mole) of 3-penten-2-one and held at reflux under a nitrogen atmosphere and with stirring for 23 hours. After cooling, the mixture is treated with 9 ml of an acetate buffer solution (50 g of anhydrous sodium acetate, 100 ml of water and 100 ml of glacial acetic acid) and held at reflux for 4 hours. For the working up, the reaction mixture is taken up in ether-ice, washed twice with 2N hydrochloric acid, twice with saturated aqueous sodium bicarbonate solution and finally again with water. It is dried over magnesium sulfate and the solvent removed, 25 g of a crude mixture being obtained. This is filtered over the 10-fold amount of silica gel in benzene-ether = 19:1, there being isolated 4 g of crude product which, after distillation in the bulb-tube yield 2.92 g of 4-methyl-6-isoprpenyl-2,3,4,4a,5,6,7,8-octahydro-2-naphthalenone with the boiling point 100°–110°C/0.03 Torr. $n_D{}^{20}$ = 1.5247; UV spectrum (ethanol): $\lambda_{max}$ at 238 mm ($\epsilon$ = 14,170); IR spectrum (CCl$_4$): bands at 1,680, 1,650, 1,638 cm$^{-1}$, 900 cm$^{-1}$; NMR spectrum (CDCl$_3$): $\delta$ = 1.05 ppm (b,3H); 1.76 ppm (s,3H); 4.76 ppm (s,2H); 5.85 ppm (s,1H). According to the latter data, with the product it is a case of a mixture of stereoisomers.

This mixture smells markedly green, woody and cedarlike.

b. 760 mq (20 m mole) of lithium aluminum hydride are suspended in 42 ml of absolute ether. The mixture is cooled to 0°C and, in a nitrogen atmosphere and with stirring, a solution of 1.0 g (5m mole) of 4-methyl-6-isopropenyl-2,3,4,4a,5,6,7,8-octahydro-2-naphthalenone in 42 ml of absolute ether is added dropwise. The mixture is thereupon stirred at room temperature for 16 hours. It is thereupon cooled to 0°C and the excess lithium aluminum hydride destroyed by addition of ethyl acetate. For the working up, the mixture is taken up in ether-ice and washed neutral with water. The organic phase is dried over magnesium sulfate and the solvent removed. There are thus obtained 1.01 g of an oil which, after bulb-tube distillation, yield 816 mg of 2-hydroxy-4-methyl-6-isopropenyl-2,3,4,4a,5,6,7,8-octahydro-naphthalene with the boiling point 125°–130°C/0.15 Torr. $n_D{}^{20}$ = 1.5122; IR spectrum (CCl$_4$): bands at 3,350, 1,650, 900 cm$^{-1}$; NMR spectrum (CDCl$_3$): $\delta$ = 0.97 ppm (b, 3H); 1.72 ppm (s,3H); 4.70 ppm (s, 2H); 5.39 ppm (s, 1H).

The substance smells woody, slightly earthy and is reminiscent of guaiac and sandalwood. According to the NMR data obtained, the isolated product exists as a mixture of stereoisomers.

EXAMPLE 5 a. 140.2 g (1 mole) 4-isopropyl cyclohexanone and 90.2 g of piperidine (1.06 mole) are placed in a 2 litre round bottomed flask equipped with stirrer, cooler, thermometer and Dean-Stark and Barrett trap and water remover. 400 ml of toluene are added and the mixture heated under reflux for 6 hours. After this time no further separation of water is noted. The excess piperidine and toluene are removed by distillation. After distillation of approximately 250 ml substantially all of the piperidine has been removed. The apparatus is then flushed with nitrogen for about 10 minutes, and a solution of 70.9 g (1 mole) of methylvinyl ketone in 300 ml of toluene is added dropwise over a period of 30 minutes. During the addition temperature rises to about 65°C. The mixture is then heated under reflux and in a nitrogen atmosphere approximately 24 hours. The mixture is then cooled to 25°C and 400 ml of 20% aqueous hydrochloric acid added thereto. The mixture is then heated for 4 hours at between 75° and 80°C and cooled to ambient temperature. 800 ml of toluene are added, the layers separated, and the organic layer washed sequentially with 100 ml of 10% aqueous sodium carbonate, and four times with 100 ml portions of water. The organic layer is dried, and evaporated to yield a residual organic material. The residue is distilled through a column charged with glass beads. After approximately 28.7 grams of pre-run have distilled over, 6-isopropyl-2,3,4,4a,5,6,7,8-octahydro-2-naphthalenone (54.6 g) distills over in the range of 109° to 115°C/0.75–1mmHg; $n_D{}^{20}$ 1.515–1.520. The purity of the material is 97% (gas chromatography shows the presence of 2 isomers.

b. 150 ml of distilled water, 150 ml of p-dioxane and 20 g of sodiumborohydride (0.58 mole) are charged to a 500 ml round bottomed flask equipped with stirrer, cooler, dropping funnel, and thermometer. There are added thereto 48.1 g (0.25 mole) of 6-isopropyl-2,3,4,4a,5,6,7,8-octahydro-2-naphthalenone in a dropwise fashion over a period of 30 minutes during which time the reaction vessel is cooled to maintain a temperature of between 25° to 30°C. The reaction is held at this temperature for 4 hours with stirring. The reaction mixture is thereupon extracted with 350 ml of ether, and the ether layer washed twice with 100 ml portions of water, dried over magnesium sulfate, filtered, and the extract evaporated under reduced pressure. Distillation of the residue through a column packed with glass beads yields 34.2 g of 2-hydroxy-6-isopropyl-2,3,4,4a,5,6,7,8-octahydro-naphthalene (yield: 77%) b.p. 112°–114°C/0.9 mm, $n_D{}^{22}$ 1.5049.

c. 78 g (0.4 mole) of 6-isopropyl-2,3,4,4a,5,6,7,8-octahydro-2-naphthalenone are hydrogenated in 150 ml of ethanol in the presence of 8g of 5% palladium on charcoal, under a hydrogen pressure of 2 atmospheres. The reaction is complete in 30 minutes. The reaction mixture is suction-filtered through a Super-cel bed and the residue washed with ethanol. The ethanol solutions are mixed and evaporated under reduced pressure. Distillation of the residue through a column packed with glass beads yields 60 grams (76% yield) of 6-isopropyl-1,2,3,4,4a,5,6,7,8,8a-decahydro-2-naphthalenone, b.p. 88–89° 0.4 mm. $n_D{}^{22}$ 1.4884.

d. A 500 ml round bottomed flask equipped with stirrer, thermometer, external cooling, and a dropping funnel is flushed with nitrogen. A nitrogen atmosphere is maintained and 2.3 g (0.06 mole) of lithium aluminum hydride and 250 ml of dry ether are added thereto. 38.8 g (0.2 mole) of 6-isopropyl-1,2,3,4,4a,5,6,7,8,8a-decahydro-2-naphthalenone added dropwise over a period of 1 hour while maintaining the reaction vessel at 25°–30°C by external cooling. Cooling is maintained for a further 4 hours and the reaction mixture stirred at the given temperature. Under continued cooling a saturated aqueous solution of sodium sulfate is added thereto until the thus formed gray-colored precipitate redissolves. The reaction mixture is filtered and residual material is washed with ether. The ether layer is washed with 2 portions of 100 ml saturated sodium chloride solution, dried over magnesium sulfate, filtered and concentrated by evaporation of the solvent under reduced pressure. The residual material is fractionally distilled through a column packed with glass beads to yield 2-hydroxy-6-isopropyl-1,2,3,4,4a,5,6,7,8,8a-decahydronaphthalene as an isomeric (epimeric) mixture b.p. 94° to 99°C/0.4–0.6 mmHg, (27.7 g), 71% yield, $n_{21}^D = 1.4954$.

EXAMPLE 6 a. 2.52 g (46.4 mmol) of dried sodium methylate are suspended in 4C ml of absolute benzene. With stirring, this suspension is treated with a solution of 3.44 g (46.4 mmol) of absolute formic acid ethyl ester in 25 ml of absolute benzene. After stirring for 30 minutes, a solution of 3.2 g (23.2 mmol) of 4-isopropylidene-cyclohexanone in 15 ml of absolute benzene is added dropwise. The mixture is thereupon further stirred for 18 hours in a nitrogen atmosphere at room temperature. For the working up, the suspension is treated with ice-cold 2-N hydrochloric acid up to the weakly acidic reaction; the crude mixture thus obtained is taken up in methylene chloride, washed neutral with a common salt solution, the organic phase dried with magnesium sulphate and evaporated to dryness. There are obtained 3.5 g (21 mol) of 2-hydroxymethylene-4-isopropylidene-cyclohexanone [IR spectrum (CCl$_4$): bands at 1,660; 1,595 cm$^{-1}$] which after drying in high vacuum can be directly further processed. 3.5 g (21 mmol) of 2-hydroxymethylene-4-isopropylidene-cyclohexanone are dissolved in 30 ml of absolute acetone and treated with 7.7 g (55.5 mmol) of anhydrous potassium carbonate. A solution of 15.3 g (108 mmol) of methyl iodide in 29 ml of absolute acetone is added dropwise. With exclusion of light and in a nitrogen atmosphere, the reaction mixture is stirred at room temperature for 18 hours. For the working up, it is firstly filtered off from potassium carbonate and the filtrate concentrated (40°C/water-jet vacuum). The crude product is poured onto ether-ice and the organic phase washed neutral with a sodium chloride solution. After drying over magnesium sulphate and evaporation of the solvent, there are obtained 3.6 g (20 mmol) of 2-formyl-2-methyl-4-isopropylidene-cyclohexanone [IR spectrum (CCl$_4$): bands at 2,750, 1,740, 1,710 cm$^{-1}$] which are suitable for further processing. 1.7 g (42.5 mmol) of sodium hydroxide are dissolved in 17 ml of water and 30 ml of methanol. A solution of 3.6 g (20 mmol) of 2-formyl-2-methyl-4-isopropylidene-cyclohexanone in 21 ml of methanol is added thereto. The mixture is stirred for 1 hour at room temperature in a nitrogen atmosphere.

For the working up, the reaction mixture is taken up in ether/ice, washed with 2-N caustic soda then with saturated common salt solution, the organic phase is dried with magnesium sulphate and evaporated to dryness. There are obtained 4 g of a crude product which, after distillation in the bulb-tube, give 1.6 g of 2-methyl-4-isopropylidene-cyclohexanone with the boiling point 110°–115°/11 Torr. $n_D^{20} = 1.4828$; IR spectrum (CCl$_4$); band at 1,720 cm$^{-1}$. NMR spectrum (CHCl$_3$); $\delta = 1.08$ ppm (d, 3H, J = 6 cps); 1.74 ppm (s, 6H).

b. Starting from 2-methyl-4-isopropylidene-cyclohexanone, by annelation with vinyl methyl ketone analogously to Example 1 there can be obtained 4a-methyl-6-isopropylidene-2,3,4,4a,5,6,7,8-octahydro-2-naphthalenone with the boiling point 100°C/0.01 Torr. UV spectrum (ethanol): $\lambda_{max} = 233$ nm ($\epsilon = 12,600$). IR spectrum (CCl$_4$): bands at 1,680 and 1,628 cm$^{-1}$. NMR spectrum (CDCl$_3$): $\delta = 1.15$ ppm (s, 3H); 1.73 ppm (s, 6H); 5.75 ppm (s, 1H). The compound displays a woody note in the direction of vetiver.

EXAMPLE 7

1.33 g (9.65 mmol) of 4-isopropylidene-cyclohexanone and 1.62 ml (20 mmol) of pyrrolidine are dissolved in 7 ml of absolute benzene; the mixture is held at reflux for 16 hours in a nitrogen atmosphere at the water-separater. After cooling, benzene and excess pyrrolidine are removed by evaporation (water-jet vacuum/60°C) and subsequent drying in high vacuum at 25°C for 1 hour. The residue (1.8 g) is dissolved in 4 ml of absolute toluene, the solution is treated at room temperature with 1.26 g (15 mmol) of 3-penten-2-one and held at reflux in a nitrogen atmosphere and with stirring for 23 hours. After cooling, the mixture is treated with 0.9 ml of an acetate buffer solution (50 g of anhydrous sodium acetate, 100 ml of water and 100 ml of glacial acetic acid) and held at reflux for 4 hours. For the purpose of working up, the mixture is taken up in ether/ice, washed once with ice-cold 2-N hydrochloric acid then 3 times with saturated common salt solution. The organic solution is dried over magnesium sulphate and the solvent removed, 1.6 g of a crude mixture being obtained. This is chromatographed on the 50-fold amount of Silica gel. With benzene-ether = 19:1, there can be eluted 0.29 g of crude product which, after distillation in the bulb-tube, give 0.21 g of 4-methyl-6-isopropylidene-2,3,4,4a,5,6,7,8-octahydro-2-naphthalenone with the boiling point 110°/0.01 Torr. $n_D^{20} = 1.5371$; IR spectrum (CCl$_4$): bands at 1,680, 1,628 cm$^{-1}$; UV spectrum (ethanol): $\mu_{max} = 232$ nm ($\epsilon = 13,400$); NMR spectrum (CDCl$_3$): $\delta = 1.10$ ppm (d, J = 6 cps, 3H); 1.71 ppm (s, 6H); 5.85 ppm (s, 1H). The substance has a floral note in the direction of rose, and is reminiscent of citronellol.

EXAMPLE 8

| Odorant composition (Gardenia type) | Parts by weight |
|---|---|
| 6-Isopropenyl-2,3,4,4a,5,6,7,8-octahydro-2-naphthalenone | 10 |
| Bergamotte oil Reggio | 25 |
| Styrallyl acetate | 20 |
| Ylang ylang oil Bourbon | 20 |
| α-Ionone | 25 |
| α-Amylcinnamaldehyde | 25 |
| Benzyl acetate | 20 |
| Phenylethyl alcohol | 20 |
| Jasmin type odorant | 3 |
| Nonalactone 10% in phthalic acid | |

-Continued

| | |
|---|---|
| diethyl ester | 5 |
| γ-Undecalactone 10% in phthalic acid diethyl ester | 2 |
| Hydroxycitronellal | 30 |
| Linalool | 20 |
| Heliotropin | 25 |
| Citronellol laevo | 20 |
| | 270 |

EXAMPLE 9

Odorant composition (Eau de Cologne parfumée)

| | Parts by weight |
|---|---|
| 4a-Methyl-6-isopropenyl-2,3,4,4a,5,6,7,8-octahydro-2-naphthalenone | 50 |
| Basil oil | 5 |
| Estrogen oil | 5 |
| Galbanum oil | 5 |
| Coriander oil | 10 |
| Undecylenealdehyde 10% in phthalic acid diethyl ester | 10 |
| Methylnonylacetaldehyde 10% in phthalic acid diethyl ester | 10 |
| Sauge sclarée | 10 |
| Vetiver oil Bourbon | 20 |
| Eugenol | 10 |
| Mousse de Chene sol. | 10 |
| Bergamotte oil Reggio | 250 |
| Lemon oil (Spanish) | 80 |
| Orange oil (Californ.) | 50 |
| Lavender oil | 30 |
| Jasmine type odorant | 5 |
| Cedryl acetate cryst. | 40 |
| Santalol | 20 |
| 4-Methyl-7-ethoxycoumarin 10% phthalic acid diethyl ester | 20 |
| Rés. labdanum | 10 |
| | 650 |

EXAMPLE 10

Citrus cologne fragrances were prepared utilizing 4 of the compounds of the present invention. The compositions are set forth in Table I below. For the sake of brevity the compounds have been designated by letters as follows:

A. 6-isopropyl-2,3,4,4a,5,6,7,8-octahydro-2-naphthalenone.

B. 2-hydroxy-6-isopropyl-2,3,4,4a,5,6,7,8-octahydro-2-naphthalene.

C. 6-isopropyl-1,2,3,4,4a,5,6,7,8,8a-decahydro-2-naphthalenone.

D. 2-hydroxy-6-isopropyl-1,2,3,4,4a,5,6,7,8,8a-decahydronaphtalene.

TABLE I

| | i | ii | iii | iv |
|---|---|---|---|---|
| Undecylenic aldehyde | 2 | 2 | 2 | 2 |
| Cedryl acetate | 185 | 185 | 185 | 185 |
| Clove bud oil | 20 | 20 | 20 | 20 |
| Costus oil | 1 | 1 | 1 | 1 |
| Diethyl phthalate | 90 | 80 | 90 | 90 |
| Estragon oil | 30 | 30 | 30 | 30 |
| Galbanum oil | 10 | 10 | 10 | 10 |
| Isobornyl acetate | 30 | 30 | 30 | 30 |
| Laurine extra [1] | 30 | 20 | 30 | 30 |
| Lavender 38/42 | 112 | 112 | 112 | 112 |
| Lemon oil | 362 | 352 | 362 | 362 |
| Musk ambrette | 10 | 10 | 10 | 10 |
| Sage clary oil | 90 | 90 | 95 | 90 |
| Sandela CD [2] | 7 | 7 | 7 | 7 |
| Vanillin | 1 | 1 | 1 | 1 |
| Versalide [3] | 10 | 10 | 10 | 10 |
| A | 10 | — | — | — |
| B | — | 40 | — | — |
| C | — | — | 5 | — |
| D | — | — | — | 10 |

[1] Registered trademark of Givaudan Corporation for hydroxycitronellal.
[2] Registered trademark of Givaudan Corporation for isocamphyl cyclohexanol (U.S. Pat. No. 3,499,937).
[3] Registered trademark of Givaudan Corporation for 1,1,4,4-tetramethyl-6-ethyl-7-acetyl-1,2,3,4-tetrahydronaphthalene.

In formulation (i) it was found that 1% of Compound A contributes a pleasing warm citrus nuance which enhances the citrus character of the fragrance during dry out.

In formulation (ii) it was found that 4% of Compound B contributes a warm woody rose character which makes the fragrance much more pleasing.

In formulation (iii) it was found that 0.5% of Compound C contributes an outstanding citrus nuance and also lend substantial "lift" to the fragrance. The fragrance with Compound C is far superior to that without Compound C.

In formulation (iv) it was found that 1% of Compound D contributes very pleasing warm woody floral nuance which is not unlike that which would be produced by vetiverol. The fragrance with Compound D is far superior to that without Compound D.

We claim:

1. A compound of the general formula wherein $R_1$ and $R_2$ signify hydrogen or methyl, but at least one of the symbols $R_1$ and $R_2$ signifies hydrogen, and $R_3$ is isopropyl, isopropenyl or isopropylidene.

2. 4a-Methyl-6-isopropenyl-2,3,4,4a,5,6,7,8-octahydro-2-naphthalenone.

3. 6-Isopropenyl-2,3,4,4a,5,6,7,8-octahydro-2-naphthalenone.

4. 6-Isopropyl-2,3,4,4a,5,6,7,8-octahydro-2-naphthalenone.

* * * * *